UNITED STATES PATENT OFFICE.

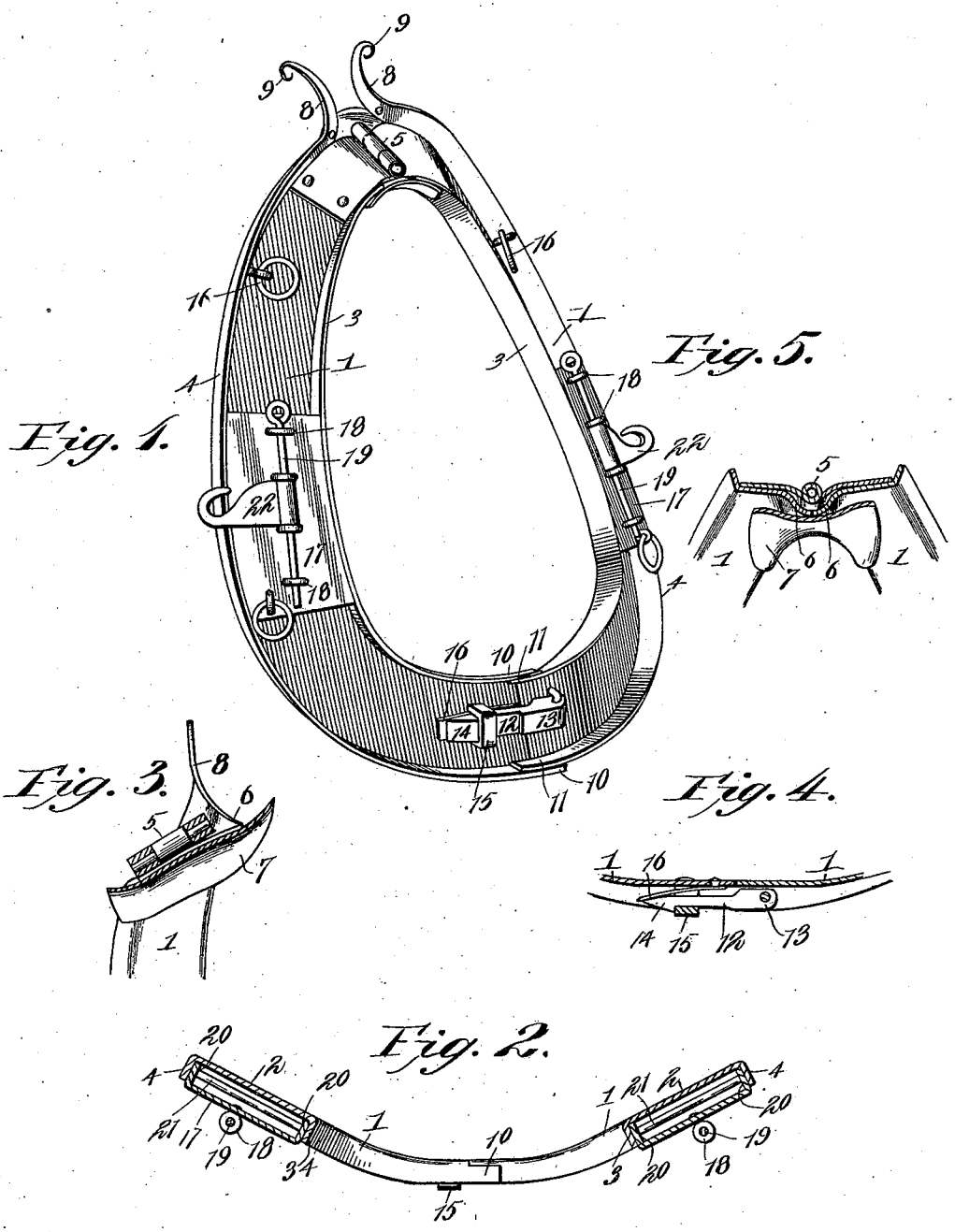

ABRAHAM B. HARRIS, OF ETTER, VIRGINIA.

HORSE-COLLAR.

SPECIFICATION forming part of Letters Patent No. 664,267, dated December 18, 1900.

Application filed July 7, 1900. Serial No. 22,863. (No model.)

*To all whom it may concern:*

Be it known that I, ABRAHAM B. HARRIS, a citizen of the United States, residing at Etter, in the county of Wythe and State of Virginia, have invented a new and useful Horse-Collar, of which the following is a specification.

The invention relates to improvements in horse-collars.

One object of the present invention is to improve the construction of horse-collars and to provide a simple, strong, and durable one designed to dispense with the use of hames and adapted to fit properly the shoulders of a horse and prevent the animal from being chafed or otherwise injured.

Another object of the invention is to provide a horse-collar of this character which will be adapted to be used in connection with the ordinary harness and which will admit of a vertical adjustment of the devices for connecting the traces or draft-chains to it.

The invention consists in the construction and novel combination and arrangement of parts hereinafter fully described, illustrated in the accompanying drawings, and pointed out in the claims hereto appended.

In the drawings, Figure 1 is a perspective view of a horse-collar constructed in accordance with this invention. Fig. 2 is a horizontal sectional view. Fig. 3 is a detail sectional view illustrating the manner of hinging the sections of the collar. Fig. 4 is a detail sectional view illustrating a construction of the locking device. Fig. 5 is a detail sectional view taken at right angles to Fig. 3.

Like numerals of reference designate corresponding parts in all the figures of the drawings.

1 1 designate two sections of a horse-collar, which is constructed of stout material, such as heavy sheet metal, and each section, which is curved to conform to the configuration of a horse-collar, presents a smooth flat inner face 2 to the shoulder of a horse or other animal and is provided with inner and outer longitudinal flanges 3 and 4, extending outward and forming a longitudinal groove or recess at the front of the collar. The sections are connected at the top of the collar by a hinge 5, having its leaves or sections secured to the sections of the collar and arranged in the space or recess between the side flanges 3 and 4, so that the said leaves or sections will not only be out of the way, but will be supported by the flanges. The upper ends of the sections of the collar are provided with curved extensions 6, projecting rearward and arranged to abut against each other and forming a recess for the central portion of the hinge. The curved extensions 6, which abut against each other when the collar is closed, support the upper portion of the collar, which is provided with a shield or guard 7, constructed of metal and secured to one of the sections of the collar, as clearly shown in Fig. 5 of the accompanying drawings. The upper and lower ends of the shield extend slightly beyond the sections of the collar, as clearly shown in Fig. 3, and the said shield is adapted to present a smooth face to the animal at the top of the collar.

The collar is provided at its top with upwardly-extending arms 8, preferably consisting of extensions of and formed integral with the outer flanges 4 and curved outward at their terminals, whereby they are adapted to receive and retain the checkrein. The terminals 9 of the arms 8 form distinct hooks and are adapted to effectually prevent the checkrein from being accidentally thrown off the arms 8 by the movements of the head of an animal.

The sections of the collar are provided at their lower ends with overlapping arms 10 and 11, consisting of extensions of the inner and outer flanges 3 and 4 and adapted to prevent the sections from moving on each other and straining or weakening their hinged connection at the top of the collar. These arms 10 and 11 assist in providing a rigid collar, and the lower ends of the sections are connected by a latch 12, having its end 13 pivoted to one of the sections and provided at its other end with a catch 14, adapted to engage a keeper 15 of the other section of the horse-collar. The catch consists of a beveled head provided at its inner end with a shoulder, which is held in engagement with the keeper 15 by a spring 16, extending through the keeper and bearing against the inner face of the pivoted latch at the engaging end thereof. The latch may be hinged or pivoted by a staple or any other suitable means, and the spring, which is secured at one end to the adjacent section of the collar, has its other end free. By this construction an efficient locking device is provided and the sections may be readily fastened and unfastened.

The collar is provided at its upper portion with rings 16 for the lines and has supports 17 located between the ends of the sections and provided with alined eyes or rings 18 for the reception of rods or pins 19. The supports, which are constructed of sheet metal or other suitable material, consist of plates which are provided with side flanges 20, arranged between the inner and outer flanges 3 and 4 and secured to the same by transverse pins 21 or other suitable fastening devices. These supports also form braces and strengthen the collar at the points where it is subjected to the greatest strain. The pins 19 are adapted to secure hame-hooks 22 or other suitable fastening devices for connecting draft-chains, traces, or the like to the collar, and the eyes 18, which are arranged at intervals, are adapted to permit the hooks to be adjusted to arrange them at the desired elevation.

It will be seen that the horse-collar is simple and comparatively inexpensive in construction, that it possesses great strength and durability, and that it is adapted to conform to the configuration of a horse and to fit snugly against the same to avoid chafing or otherwise injuring or annoying the animal. It will also be apparent that the draft is adapted to be raised and lowered and that the sections are rigidly supported in their closed or locked position. The supports which receive the eyes 18 are also adapted to have the rings secured to them for the attachment of the breast-chains, as clearly shown in Fig. 1.

What I claim is—

1. A horse-collar comprising two sections provided at their side edges with longitudinal flanges, a hinge connecting the upper ends of the sections and arranged within the space between the longitudinal flanges and having its eyes located adjacent to the upper ends of the sections, said ends being curved downward to conform to the configuration of the eyes, and the guard presenting a concave face to the horse's neck and fixed to one of the sections at the upper end thereof and overlapping the other section to prevent the curved portions of the sections from coming in contact with an animal, substantially as described.

2. A horse-collar comprising the sections having inner and outer longitudinal flanges and provided at their upper ends with arms forming continuations of the outer flanges, a hinge connecting the upper ends of the sections and arranged in the space between the inner and outer flanges, and means for connecting the lower ends of the sections, substantially as described.

3. A horse-collar comprising two sections hinged at their upper ends and provided at their inner and outer side edges with longitudinal flanges and abutting together at their lower ends, said flanges being extended and forming a pair of overlapping arms 10 and 11, at each of the sides of the sections, and a locking device arranged in the space between the side flanges, substantially as described.

In testimony that I claim the foregoing as my own I have hereto affixed my signature in the presence of two witnesses.

ABRAHAM B. HARRIS.

Witnesses:
 JOS. C. CASSELL,
 S. L. PORTER.